UNITED STATES PATENT OFFICE.

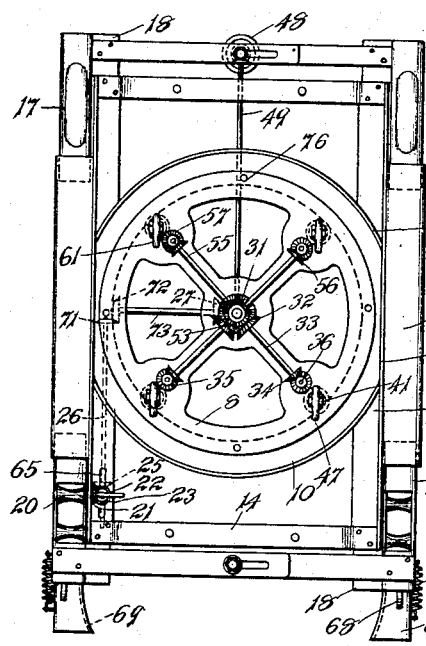

ALBERT L. SESSIONS, OF BRISTOL, CONNECTICUT.

TURN-TABLE TRUCK.

1,172,399.  Specification of Letters Patent.  Patented Feb. 22, 1916.

Application filed April 18, 1913. Serial No. 761,956.

*To all whom it may concern:*

Be it known that I, ALBERT L. SESSIONS, a citizen of the United States, and a resident of Bristol, in the county of Hartford and State of Connecticut, have invented a new and Improved Turn-Table Truck, of which the following is a specification.

My invention relates to devices more especially intended for the movement and placing of automobiles or like vehicles in closely crowded quarters, and an object of my invention, among others, is to provide a device of this class upon which an automobile or like vehicle may be readily placed and by means of which it may be moved to any desired spot in garages or like places, usually having other vehicles closely located therein.

One form of truck embodying my invention and in the construction and use of which the objects hereinabove set out, as well as others, may be attained, is illustrated in the accompanying drawings in which—

Figure 1 is a bottom view of a truck embodying my invention, certain of the parts, show in other views, being omitted, it being impossible to show such parts clearly on account of the smallness of the scale. Fig. 2 is a view in central vertical section through the structure, the base being shown in full. Fig. 3 is a side view, scale enlarged, of my improved truck, the skids being broken off. Fig. 4 is a view in central vertical section, scale enlarged, the platform being turned to the left with respect to the showing in Fig. 1 and located at an angle of 45 degrees from the position shown in that figure, the point of view, with respect to the platform, being the same as in Fig. 2. Fig. 5 is a detail top view illustrating the construction of one of the caster supports. Fig. 6 is a detail view illustrating the construction and operation of the skids. Fig. 7 is a detail view illustrating the lateral adjustability of the parts to accommodate vehicles having treads of different widths. Fig. 8 is a view in vertical section illustrating the same point, the base being omitted. Fig. 9 is a detail view illustrating the manner of mounting the upper end of the vertically disposed driving shaft, scale enlarged. Fig. 10 is a detail view showing the method of connecting a roller shaft and the vertically disposed driving shaft, these parts being omitted from the other views on account of the small scale and to simplify the showing.

In the accompanying drawings the numeral 8 indicates a base, that may be constructed of any suitable material, preferably metal, and of any desired form. As herein shown, this base is in the form of a round disk, although I do not confine myself to such construction. A circular groove 9 is formed in this disk, and a ring 10 is mounted upon the disk, ball bearings 11 being located in the groove in the disk and between said disk and the ring, the latter having a bearing flange 12 for the support of a platform. This platform consists of a frame including side bars 13, and end bars 14, the former being firmly secured as by rivets, bolts or the like, to the ring 10, and having a downwardly extending flange 15 resting against the bearing flange 12.

A running board 16 is supported by the frame, as by means of a flange riveted or otherwise secured to the flange 15. Brackets 17 oppositely located at each end of the frame have shelves 18 resting upon the top of the frame, each bracket having a foot or tread support resting upon the running board. These brackets are adjustably mounted as by means of bolts on the brackets engaging slots 75 in the flanges of the running boards. Spools 20 preferably having corrugated surfaces, are rotatably mounted in brackets on opposite sides of the frame at one end thereof, and one or more of said spools (on one side only, as shown herein) is geared to drive the truck. In the construction herein shown a bevel pinion 21 is secured to the shaft of one of the rollers and meshes with a like pinion 22 secured to a shaft 23 vertically arranged on the frame and having a bevel pinion 24, meshing with a bevel pinion 25, on a connecting-shaft 26, mounted in bearings on the top of the frame, and having a bevel pinion 71 meshing with a bevel pinion 72 on a cross shaft 73, also mounted on the top of the frame and having a bevel pinion 27 meshing with a bevel pinion 28 secured to a sleeve 30 passing through and having a suitable bearing in the base 8. A bevel gear 31 secured to the opposite end of the sleeve 30 meshes with a bevel gear 32 on a connecting shaft 33, having a bevel gear 34 meshing with a bevel gear 35, on a shaft 36. This latter shaft is mounted in the base near its edge and has a spur pinion 37, meshing with a spur gear 38, secured to a shaft 39, projecting through the shank 40 of a caster frame 41. A bevel pinion 42 is secured to the opposite end of this shaft and meshes with a bevel pinion 43 on a shaft 44, mounted in the frame of the caster. The shaft 44 has a pinion 45 secured thereto which pinion meshes with a gear 46, secured to the shaft of the roller 47 of the caster. This description applies to a connection extending to one of the casters only, but it will be understood that a like connection extends to the caster on the opposite side of the frame but on the same end as that above described; that is, the casters located at one end of the frame have their rollers each driven by the connection above described.

A steering wheel 48 or similar device is mounted at the front of the truck and is suitably connected to rotate a steering shaft 49 extending along and mounted upon the top of the platform and having a bevel pinion 50 meshing with a bevel pinion 51 on a short shaft 52 extending through and having a bearing within the sleeve 30. The opposite end of this shaft has a bevel pinion 53 secured thereto meshing with a bevel pinion 54 on a cross shaft 55 mounted underneath the truck and having at its opposite end a bevel pinion 56 meshing with a bevel pinion 57 secured to a short shaft 58 extending through the base 8 and having at its upper end a pinion 59 meshing with a gear 60 secured to the shank of the casters 61.

From the construction thus far described it will be seen that with an automobile in place on the truck the power of the automobile may be used to move the truck through the medium of the driving wheels of the automobile and the rollers or spools 20 on the truck, the movement of which may be controlled by means of the hand wheel 48 and the connections therefrom to the casters 61.

As hereinabove described the brackets 17 may be adjusted toward and from each other to adapt the truck to automobiles of various lengths, and to this end the pinion 25 is splined to the connecting shaft 26 to enable the bracket to be moved while keeping the pinions in mesh and the pinion 50 is splined to the shaft 49. The brackets may also be adjusted laterally of the truck for the purpose of accommodating vehicles having treads of varying width, and to this end the pinion 21 is splined to the shaft or spindle 62 of one of the driving rollers or spools, and as clearly shown in Fig. 8 of the drawings. The mechanism enabling this adjustability includes supports 16 having arms 64 attached to the platform and extending on to the end bars 14, each of said arms being adjustably secured in position as by means of a bolt and slot connection, as shown in Fig. 7, it being understood that this arrangement may be provided at each of the supporting rollers. In order to provide for horizontal movement of the shafts 23 occasioned by these adjustments, a bearing sleeve 63 for each shaft is mounted in a slot 65 in each of the side bars 13, the various parts being slotted and recessed to permit movement of this shaft in adjusting the parts, and a tie 80 is employed to hold the shafts 23 and 62 in operative relation.

Skids 66 are pivotally secured to the brackets, as shown in Fig. 6, as an aid in running a vehicle onto the truck, these skids being held in a normally raised position as by means of springs 67, the outer ends of the skids, however, being located in such position that they will be readily depressed when struck by the wheels of the vehicle traveling onto the truck. Strut supports 68 project from the under sides of the skids in position to press against the floor when the skids are depressed, thus forming a support for the brackets and the frame of the truck when a vehicle is passing onto it. When the vehicle is located in position on the truck the weight will be so disposed that the skids may be raised by the application of little force, when it is desired to move the truck with the vehicle thereon. These skids have guide flanges 69 (shown in dotted lines in Fig. 1) converging with respect to each other so that a vehicle will be guided in its movement onto the truck. Jacks 70 of any suitable form and construction may be adjustably mounted upon the platform in position to underlie the axle of the vehicle, the weight of which may, by means of the jacks, be removed from the tread of the wheel.

While I have shown and described herein a preferred form of mechanism for accomplishing my purpose, it will be understood that this may be departed from, to a greater or lesser extent, and yet embody the invention, and I do not therefore limit my invention to the exact construction herein shown and described.

Holes 76 are formed in the base 8 and in the ring 10 in registering relation one with respect to the other, and a pin inserted through said holes will serve to lock the ring and consequently the supported platform in different rotatable positions upon the supporting base. It will be understood that any other form of lock for securing the parts against relative rotary movement may be employed.

I claim:

1. A turn table truck including a portable frame, a turn table rotatably mounted on the frame and having means to support a vehicle, roller supports secured to the frame and arranged to move it in all directions, and means for controlling the position of the roller supports.

2. A vehicle moving truck including a portable frame, means supported by the frame to receive the wheels of a vehicle and including spools upon which said wheels rest, roller supports for said frame and arranged to move it in all directions, and driving connections between said spools and said roller supports.

3. A turn table truck including a portable frame, a turn table rotatably mounted on the frame and having means to support a vehicle, roller supports secured to the frame and arranged to move it in all directions, spools mounted on the support to receive the wheels of a vehicle, and a driving connection between said spools and roller supports.

4. A turn table truck including a portable frame, vehicle supports depending from said frame and arranged to receive the wheels of a vehicle, vehicle supporting spools mounted in said supports below said frame, roller supports mounted in said frame and rising above said vehicle support, and a driving connection between said spools and said roller supports.

5. A turn table truck including a portable frame, a platform rotatably mounted on the frame, vehicle supports depending from said platform, spools rotatably mounted on said vehicle supports to receive the wheels of a vehicle, roller supports mounted in said frame and having rollers rising above said vehicle supports, and a driving connection between said spools and said roller supports.

6. A vehicle moving truck including a portable frame, vehicle supports depending from said frame, spools mounted in said supports to receive the wheels of a vehicle, roller supports mounted in said frame between said depending vehicle supports and having rollers rising above said vehicle supports, and driving connections between said spools and roller supports.

7. A turn table truck including a portable frame, a platform rotatably mounted on the frame, vehicle supports depending from opposite sides of said platform, spools rotatably mounted in said vehicle supports, roller supports mounted in said frame between said vehicle supports and having rollers rising above said vehicle supports, and a driving connection between said spools and roller supports.

8. A turn table truck including a portable frame, a platform rotatably mounted on the frame, means for locking said parts together, vehicle supports depending from said platform on opposite sides thereof, spools mounted on said vehicle supports to receive the wheels of a vehicle, roller supports mounted in said frame between said vehicle supports and having rollers rising above said vehicle supports, and a driving connection between said spools and said roller supports.

9. A vehicle moving truck including a frame, vehicle supports mounted on the frame, casters rotatably mounted in the frame on vertical axes and having rollers with their axes located out of line with the vertical axes, spools to receive the wheels of a vehicle, and a driving connection between said spools and rollers.

10. A vehicle moving truck including a frame, casters mounted on vertical axes in said frame, rollers mounted in the caster frame with their axes out of line with the vertical axes, spools located to receive the wheels of a vehicle, a driving connection between said spools and rollers, and means for constantly maintaining said connection.

11. A turn table truck including a frame, a platform rotatably mounted on the frame, spools carried by said platform to receive the wheels of a vehicle, roller supports mounted in the frame, a driving connection between said spools and roller supports, and means for maintaining said driving connection.

12. A turn table truck including a frame, a platform rotatably mounted on the frame, spools mounted on said platform to receive the wheels of a vehicle, caster frames mounted on vertical axes in said supporting frame and having roller supports with their axes out of line with said vertical axes, a driving connection between said spools and roller supports, and means for maintaining said driving connection.

13. A vehicle moving truck including a frame, vehicle supports depending from the frame at opposite sides thereof, spools located on the vehicle supports to receive the wheels of a vehicle, casters mounted on vertical axes on said frame between said vehicle supports and with their axes out of line with said vertical axes, a driving connection between said spools and roller supports, and means for maintaining said connection.

14. A turn table truck including a supporting frame, a platform rotatably mounted on said frame, vehicle supports depending from said platform on opposite sides thereof, spools rotatably mounted on the vehicle supports, caster frames mounted on vertical axes in said supporting frame, roller supports mounted in the caster frames with their axes out of line with said vertical axes, a driving connection between said spools and roller supports, and means for maintaining said connection.

15. A turn table truck including a supporting frame, vehicle supports carried by said frame to receive the wheels of a vehicle, casters mounted on vertical axes in said frame, and having roller supports with their axes located out of line with said vertical axes, a steering device, a connection between said steering device and casters, and means for maintaining said steering connection.

16. A vehicle moving truck including a supporting frame, vehicle supports carried by said frame and arranged to receive the wheels of a vehicle, spools mounted on said vehicle supports, driving casters mounted on vertical axes in said frame and having rollers with their axes located out of line with said vertical axes, a driving connection between said spools and rollers, means for maintaining said driving connection, guiding casters mounted in said frame with their axes vertically arranged and having roller supports with their axes located out of line with said vertical axes, a steering device, a steering connection between said device and said guiding casters, and means for maintaining said connection.

17. A turn table truck including a supporting frame, a platform pivotally mounted thereon, vehicle supports carried by said platform and having spools to receive the wheels of a vehicle, driving roller supports for said frame, a driving connection between said spools and said driving supports, means for maintaining said connection, guiding roller supports mounted in said frame, a steering device, a steering connection between said device and said guiding roller supports, and means for maintaining said steering connection.

18. A turn table truck including a frame, a platform rotatably mounted thereon, vehicle supports depending from opposite sides of said platform, spools rotatably mounted on said vehicle supports to receive the wheels of a vehicle, caster frames mounted on vertical axes on said supporting frame and having rollers with their axes out of line with said vertical axes, said caster frames being located between the vehicle supports and said rollers rising above said vehicle supports, guiding casters similarly mounted and having rollers mounted in like manner, a driving connection between said spools and driving rollers, a steering device, a steering connection between the guiding rollers and steering device, and means for maintaining said driving and steering connections.

19. A turn table truck including a frame, movable supports for bodily moving said frame in all directions, a turn table rotatably mounted on the frame and having means to support a vehicle, roller supports mounted in the frame and rising above the plane of the lower surface of the frame and means for controlling the position of the roller supports.

20. A turn table truck including a frame, movable supports for bodily moving said frame in all directions, a turn table rotatably mounted thereon and having vehicle supports arranged to support the wheel of a vehicle, roller supports journaled in the side parts of the frame and projecting above said vehicle supports and means for controlling the position of the roller supports.

21. A turn table truck including a portable frame, a turn table rotatably mounted on the frame and having means to support a vehicle, casters supported on vertical axes and secured to said frame as a means for moving it and means for controlling the position of the roller supports.

22. A turn table truck including a portable frame, a turn table rotatably mounted on the frame and having means to support a vehicle, casters supported on vertical axes and secured to the frame as a means for moving it, and a driving connection between said caster supports and said vehicle supports.

ALBERT L. SESSIONS.

Witnesses:
 ARTHUR B. JENKINS,
 E. A. EATON.

Copies of this patent may be obtained for five cents each, by addressing the "Commissioner of Patents, Washington, D. C."